Feb. 26, 1924.
L. H. SPRINKLE
ARTIFICIAL TOOTH
Filed Feb. 27, 1923
1,485,053
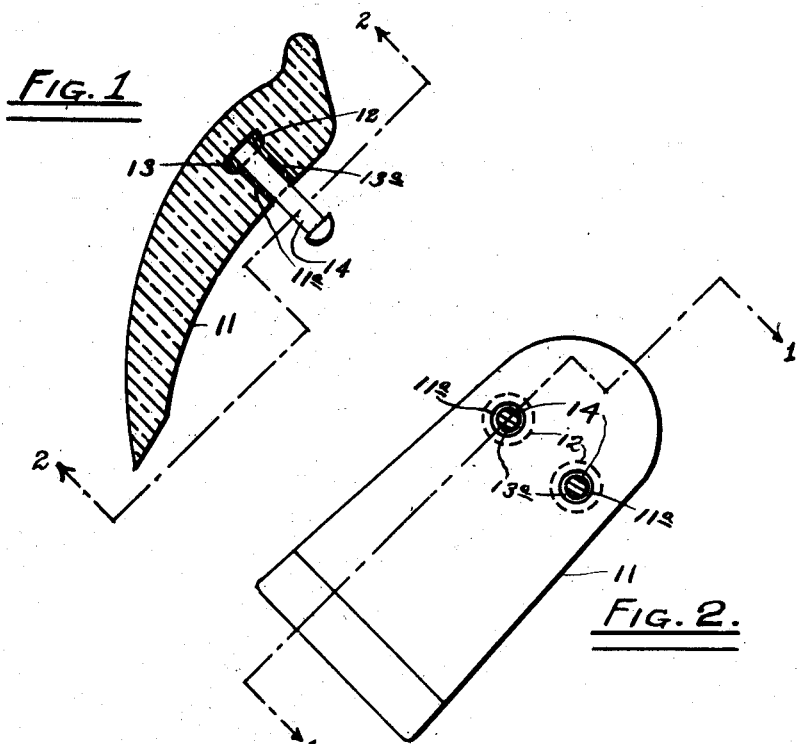
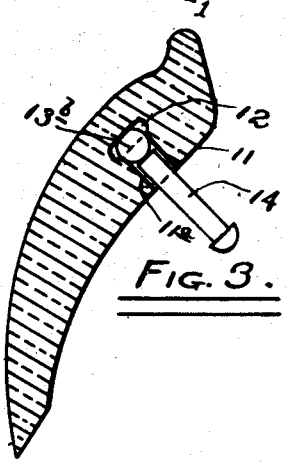
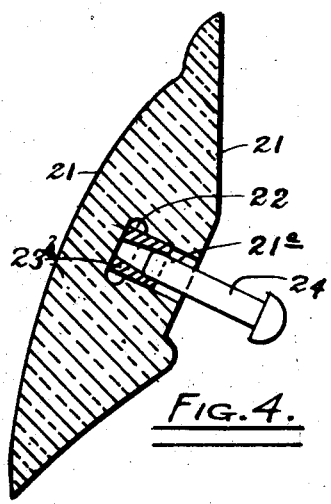
INVENTOR
LaKe H. Sprinkle
BY
Israel Benjamins
ATTORNEY Patented Feb. 26, 1924.

1,485,058

UNITED STATES PATENT OFFICE.

LAKE H. SPRINKLE, OF BROOKLYN, NEW YORK.

ARTIFICIAL TOOTH.

Application filed February 27, 1923. Serial No. 621,557.

*To all whom it may concern:*

Be it known that I, LAKE H. SPRINKLE, a citizen of the United States, residing at Brooklyn, in the county of Kings and State of New York, have invented a new and useful Artificial Tooth, of which the following is a specification.

My invention consists in the novel features hereinafter more fully described, and the objects of it are:

First: To produce an artificial tooth which has no pins or any other metal parts burned into the body thereof, to avoid the expense of platinum pins or other parts, and to avoid injuring the said pins or other parts when the latter are of any metal other than platinum.

Second: To provide a means and method for firmly uniting pins of any suitable metal or alloy to the artificial tooth after the latter is burned.

Third: To provide a means and method for uniting each pin separately to the artificial tooth after the latter is burned.

Fourth: To have said artificial tooth simple, durable and inexpensive.

I attain these objects by the artificial tooth illustrated in the accompanying drawings and by the method of forming the same, which is hereinafter described or by any mechanical equivalent or obvious modification of the same.

In the drawings Fig. 1 is a section on the line 1—1 of Fig. 2, looking in the direction of the arrows and showing my artificial tooth after the process of uniting one of the pins thereto has been completed.

Fig. 2 is a part elevation and part section on the line 2—2 of Fig. 1, looking in the direction of the arrows.

Fig. 3 is a sectional view of my artificial tooth similar to Fig. 1, but showing the tooth at the beginning of the process of uniting the pins thereto.

Fig. 4 is a sectional view of my artificial tooth similar to that of Fig. 3, but showing a somewhat different method of uniting the pins to the tooth.

Similar numerals refer to similar parts throughout the several views.

11 designates the body of an artificial tooth, which has formed therein one or more openings or cavities $11^a$, each of which terminates at the inner end thereof in the undercut 12.

To secure the pin 14 in said cavity $11^a$ after the tooth has been burned by the method illustrated in Fig. 3. I first place a lump of solder $13^b$ at the inner end of said cavity $11^a$, as shown in Fig. 3; I then raise the temperature of this solder sufficiently high to soften it, which may be done by placing the solder with the tooth into a suitable heater or oven for a short time; the pin 14 is then inserted into the outer end of the cavity $11^a$, as shown in Fig. 3; some flux may be added between the solder $13^a$ and the pin 14; the latter is then pressed home through the soft solder $13^b$, which is thereby forced to fill the undercut 12 and form the anchor 13, and it may also overflow into the clearance, if there be any between the pin 14 and the walls of the cavity $11^a$, thereby forming the thin sleeve $13^a$, as shown in Fig. 1.

When the solder hardens by cooling the pin 14 is firmly held in position in the cavity $11^a$ by the said anchor 13 and the sleeve $13^a$, if there be one, also by the pressure on or forced contact of the metal of said anchor and sleeve with the pin 14, thereby uniting the latter to the body of the tooth 11.

In the modification of my artificial tooth, shown in Fig. 4, 21 designates the body of the tooth, $21^a$ the cavity thereof, which terminates in the undercut 22, as in Figs. 1 and 3; but instead of the lumps of metal $13^b$ of any shape as shown in Fig. 3. I prefer to employ the ferrule $23^b$, which is shown as having a central opening, which is smaller than the pin 24, and tapering towards the inner end thereof; the end of the pin 24 is also shown as tapering and rounded off, to facilitate its entrance into the said opening.

It is evident that, when the pin 24 is pressed home through the said ferrule $23^b$, the lower end of the latter will spread out and fill the undercut 22 with less effort on the part of the mechanic than is required with the modification of my tooth shown in Fig. 3.

The tooth shown in Fig. 4 when finished, will look like the tooth shown in Fig. 1.

Otherwise the method employed with the modification of my artificial tooth shown in Fig. 4 does not differ materially from that employed with the modification shown in Fig. 3, and the same materials may be employed in both cases if desired.

As in the hereinbefore described case of the pin 14, the pin 24 is secured in position by the anchor which is formed in the undercut 22 and by the pressure thereof or forced contact therewith of the metal of the ferrule 23$^b$.

By these means I am able to use pins of a material other than platinum and to secure each pin in position separately after the tooth has been burned.

I do not restrict myself to the number of pins employed, nor to their relative positions or to the exact shape of the cavity in the tooth as these may be varied.

Instead of the lump 13$^b$ and the ferrule 23$^b$ being of solder, any other suitable metal or alloy may be employed, and they may have any suitable shape other than as shown in Figs. 3 and 4, if desired.

The solder 13$^b$ or the ferrule 23$^b$ may be made to adhere to the inner end of the pin 14 or 24 before inserting it into the cavity 11$^a$ or 21$^a$, if desired.

Many other changes could be made in my artificial tooth and in the method of forming the same without departing from the main scope of my invention.

I do not, therefore, restrict myself to the details as hereinbefore described or shown in the drawings; but I intend to include also all mechanical equivalents and reasonably obvious modifications of the same within the scope of my invention.

What I claim as my invention, and desire to secure by Letters Patent—is:

1. An artificial tooth having formed therein a cavity, an undercut at the inner end of said cavity, a pin placed in said cavity and an anchor consisting of a body of a suitable alloy adapted to be softened by heating, extending into said undercut, said pin being secured in position by being forced through the said body after the same had been softened by heating and thereby rendered pliable, and the said body, after being hardened by cooling, being caused thereby to be in forced contact with said pin, thereby securing the latter in position in said cavity.

2. In an artificial tooth having formed therein a cavity, an undercut at the inner end of said cavity, a pin placed in said cavity and an anchor consisting of a body of a suitable alloy, adapted to be softened by heating, extending into said undercut, said body originally having therein an opening, which is smaller than said pin, and said pin being secured in position by being forced through the said opening after the said body had been softened by heating and thereby rendered pliable, and the said body, after being hardened by cooling, being thereby caused to be in forced contact with said pin, thereby securing the latter in position in said cavity.

LAKE H. SPRINKLE.